O. M. ANDERSON.
TILING TOOL.
APPLICATION FILED JUNE 3, 1912.
1,062,945.
Patented May 27, 1913.
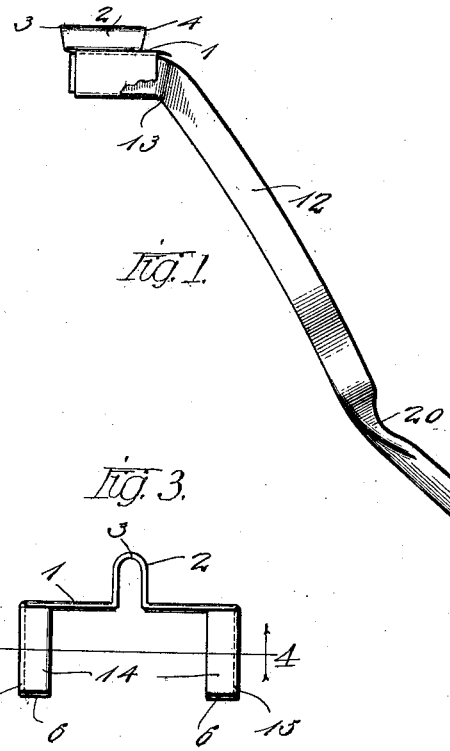
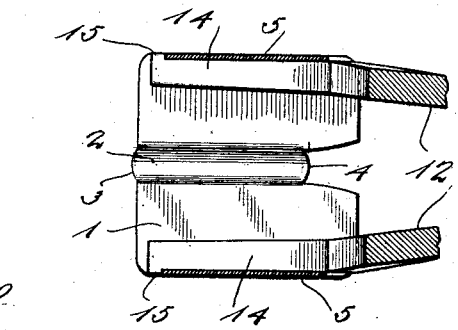
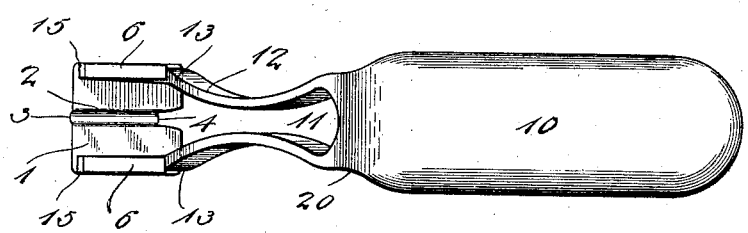
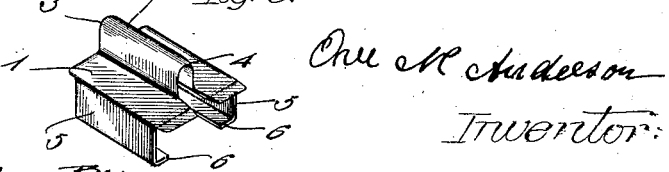

UNITED STATES PATENT OFFICE.

OVE M. ANDERSON, OF CHICAGO, ILLINOIS.

TILING-TOOL.

1,062,945.  Specification of Letters Patent.  Patented May 27, 1913.

Application filed June 3, 1912. Serial No. 701,342.

*To all whom it may concern:*

Be it known that I, OVE M. ANDERSON, a citizen of the United States, residing at Chicago, in the county of Cook and State of Illinois, have invented certain new and useful Improvements in Tiling-Tools; and I do declare the following to be a full, clear, and exact description of the invention, such as will enable others skilled in the art to which it appertains to make and use the same.

This invention relates to implements used in connection with plaster, concrete, and the like; and the object of the same is to produce an improved tool for cutting grooves therein so as to give the same the appearance of tiling. This object is accomplished by a peculiar construction of the cutter as well as the handle of this improved tool, whereby cutters of different sizes and shapes may be attached to said handle instantly.

The details are set forth in the following specification and claims, and are shown on the accompanying drawings, wherein—

Figure 1 is a side elevation of this tool complete, and Fig. 2 a plan view thereof looking at the bottom of Fig. 1; Fig. 3 is an enlarged end elevation of the cutter, showing the engagement of the hooks at the extremities of the fork-arms of the handle, and Fig. 4 is a section on the line 4—4 of Fig. 3; Fig. 5 is a perspective detail of the cutter alone.

In the drawings, and more especially in Fig. 5 thereof, the cutter forming part of this improved tool is shown as consisting of a piece of metal such as thin steel having a flat body 1 of substantially rectangular contour, bowed outward along its transverse center into an integral rib 2 of U-shaped cross section whose extremities are sharpened so as to produce cutting edges or knives as at 3 and 4, and the outer sides of said body are turned downward into wings 5 and thence inward toward each other into narrow flanges 6. The cutting edges of the knives 3 and 4 preferably converge downward slightly toward each other as best seen in Fig. 1, but this detail of construction is not essential. The handle member of this improved tool may also be made entirely of metal, and has a hand hold 10 at one extremity and its other end forked or bifurcated as at 11, the arms 12 of the bifurcation being made rather thin and standing on edge as best seen in Fig. 2 so that they may be sprung inward slightly out of their normal position, and the outer or upper ends of said arms deflected slightly as at 13, beyond which they are continued into parallel fingers 14 of rectangular cross section and of a size to pass under the body 1 inside its wings 5 and above its flanges 6 as seen in Fig. 3. By preference the outer extremities of the fingers 14 are hooked outwardly as best seen at 15 in Fig. 4, and these hooks are so spaced from the point of deflection 13 that when said point passes over the inner ends of the flanges 6 the hooks 15 may spring outward over the outer ends of the wings 5. Between the hand hold and the bifurcated portion of the handle, the latter may form a bend as shown at 20, although this is not essential; and in fact the hand-hold may itself be covered with other material than metal or shaped so as to fit the hand of the operator without departing from the principle of this invention.

The parts are assembled by pressing the two fingers 14 slightly toward each other, then inserting their hooked outer ends 15 under the inner end of the body 1 of the cutter, inside its wings 5, and above its flanges 6, and pushing said fingers through the cutter until the hooks spring outward over the outer ends of the wings as seen in Fig. 3. The complete tool is illustrated in Fig. 1 in the position which it occupies when the operator holds it to cut a groove in the ceiling or in some other overhead member, but it is understood that when grooves are to be cut in walls or floors the tool will be used accordingly. It will not be necessary to those familiar with this art to explain the use of such a tool further than to say that before the mortar or cement sets and becomes hard, the cutting rib 2 is drawn along the same (preferably alongside a straight-edge not necessary to illustrate) so that its knife 4 forms a small groove in the face of the plastic; or if desired the tool could be pushed along over the mortar or cement so that the knife 3 would form such a groove. I contemplate manufacturing this tool with a single handle member and a number of cutter members, the latter of various sizes and the ribs 2 thereof of various shapes, and it is obvious that the workman can quickly substitute one cutter for another so that the shape and dimensions of the groove he is to form in the plastic can be accurately gaged.

I do not wish to be limited to the precise details of construction further than set forth in the following claims:

1. In a tool, the combination with a cutter including a flat body, wings at right angles thereto, and inturned flanges at the outer edges of the wings, the body being formed with a cutting knife; of a handle whose outer end is bifurcated and the arms of whose bifurcation have substantially parallel fingers at their outer extremities springing normally apart and of a shape to engage beneath said body, inside said wings, and above said flanges.

2. In a tool, the combination with a cutter comprising a body carrying a cutting knife, parallel wings projecting from the edges of said body, and inturned flanges at the outer edges of said wings; of a handle including a hand hold, substantially parallel fingers carried thereby and springing normally apart, and outwardly projecting hooks at the outer ends of said fingers, for the purpose set forth.

3. In a tool for the purpose set forth, the combination with a cutter comprising a substantially flat body carrying a cutting knife and having channeled edges; of a handle having a hand hold at one extremity and bifurcated at its other end, the arms of the bifurcation being deflected out of the general line of the handle and continued into substantially parallel fingers springing normally apart and of a cross section to fit in the channeled edges of said cutter, for the purpose set forth.

4. In a tiling tool, the combination with a cutter comprising a substantially flat metallic plate of rectangular contour having an upstanding U-shaped rib at its transverse center with knives at the ends of said rib, and flanges along the edges of said body; of a handle member, and means for detachably connecting one extremity of said handle member with the flanged edges of said cutter, for the purpose set forth.

In testimony whereof I have hereunto set my hand in presence of two subscribing witnesses.

OVE M. ANDERSON.

Witnesses:
 OLAF M. NÁRVERUD,
 JOHAN HACKSTAD.

Copies of this patent may be obtained for five cents each, by addressing the "Commissioner of Patents, Washington, D. C."